United States Patent
Herron et al.

(10) Patent No.: US 12,406,537 B1
(45) Date of Patent: Sep. 2, 2025

(54) SYSTEM AND METHOD FOR REMOTE VEHICLE DIAGNOSTIC DATA COMMUNICATIONS USING CONNECTIVITY PROFILES

(71) Applicant: Opus IVS, Inc., Ann Arbor, MI (US)

(72) Inventors: Brian J. Herron, Dexter, MI (US); Robert U. Beckmann, Durham, NC (US); Andrew Woodard, Durham, NC (US); Michael Kirlauski, Durham, NC (US)

(73) Assignee: Opus IVS, Inc., Dexter, MI (US)

( * ) Notice: Subject to any disclaimer, the term of this patent is extended or adjusted under 35 U.S.C. 154(b) by 323 days.

(21) Appl. No.: 17/976,760

(22) Filed: Oct. 29, 2022

(51) Int. Cl.
*G07C 5/00* (2006.01)
*H04L 67/12* (2022.01)

(52) U.S. Cl.
CPC .............. *G07C 5/008* (2013.01); *H04L 67/12* (2013.01)

(58) Field of Classification Search
CPC ................................ G07C 5/008; H04L 67/12
See application file for complete search history.

(56) References Cited

U.S. PATENT DOCUMENTS

| | | | |
|---|---|---|---|
| 11,749,031 B1* | 9/2023 | Rusu .................... | G07C 5/0883 701/33.3 |
| 2003/0236601 A1* | 12/2003 | McLeod ................. | B60L 53/64 701/31.4 |
| 2004/0167689 A1* | 8/2004 | Bromley ................ | G07C 5/008 701/29.6 |
| 2013/0282227 A1* | 10/2013 | Chen ...................... | G07C 5/008 701/1 |

* cited by examiner

*Primary Examiner* — Ramsey Refai
(74) *Attorney, Agent, or Firm* — Gardner, Linn, Burkhart & Ondersma LLP

(57) ABSTRACT

A system and method of establishing remote diagnostic data communications between a local diagnostic computer system and a remote diagnostic computer system comprising connecting a local vehicle diagnostic computer system at a repair facility to a vehicle at the repair facility to be in communication with an electronic system of the vehicle, initiating a connection between the local vehicle diagnostic computer system and a remote diagnostic computer system, where the remote diagnostic computer system is located remotely from the repair facility and comprises a diagnostic application program for use with the electronic system of the vehicle, and selecting a remote data connectivity profile based on one or more data connectivity factors with the remote data connectivity profile being operable to set diagnostic data transmission parameters between the remote and local vehicle diagnostic computer systems whereby diagnostic data is then communicated based on the remote data connectivity profile.

20 Claims, 3 Drawing Sheets

SYSTEM AND METHOD FOR REMOTE VEHICLE DIAGNOSTIC DATA COMMUNICATIONS USING CONNECTIVITY PROFILES

BACKGROUND OF THE INVENTION

The present invention is directed to vehicle diagnostic systems, and in particular to systems and methods for aiding remote vehicle diagnostic scanning and programming by selecting a remoter diagnostic connectivity profile for data communications between a local diagnostic computer system and a remote diagnostic computer system.

Vehicle diagnostic systems employing diagnostic scan devices or tools are used in automotive repair facilities to diagnose and repair electronic computer-based vehicle systems, where vehicles may have differing computer-based systems depending on the configuration and options installed on the vehicle. Vehicle diagnostic scan systems may include or use a diagnostic scan tool device with one or more diagnostic software programs or applications for scanning, diagnosing and/or programing vehicles, such as applications developed by an original equipment automotive manufacturer ("OEM"), or an aftermarket diagnostic company. A repair facility may utilize a local computer device, such as a diagnostic scan tool device, having such diagnostic software applications downloaded to the computer, where the applications may be updated from time-to-time. Alternatively, a repair facility may access an authorized remote diagnostic computer system that includes one or more diagnostic software applications for scanning, diagnosing and/or programing the vehicle via interaction with a local computer system at the repair facility, where the local system may include a diagnostic scan tool device. Such an authorized remote diagnostic computer system may be operated or authorized by, for example, an OEM. In operation, diagnostic software applications are used to initiate the sending of request or programming signals to and receiving of response signals from the electronic system of the vehicle, such as the electronic control units ("ECUs") of the vehicle for purposes of scanning, diagnosing and/or programming the vehicle's electronic system as needed. The scanning, diagnosing and programming processes take repeated back-and-forth signal communication between the vehicle electronic system and the hardware supporting or using the diagnostic software applications.

A repair facility may be required to obtain access to a wide range of diagnostic software applications in order to service a multitude of vehicles due to the wide range of vehicle make and models available, and varying platforms and system formats used by differing OEMs. One such manner in which repair facilities obtain access to differing diagnostic software applications is via remote diagnostic systems. In a remote diagnostic system a repair facility may access, such as via an Internet connection, a diagnostic scan tool device configured as a remote diagnostic computer device that is not operated by an OEM or authorized by the OEM for use in such manner as an intermediary remote diagnostic system, with the remote diagnostic computer device having thereon diagnostic software applications that may be used remotely for scanning, diagnosing and programing vehicles at the repair facility. Alternatively, the remote diagnostic computer device may in turn access a remote system operated or authorized by an OEM in which the authorized remote diagnostic computer system includes one or more diagnostic software applications for scanning, diagnosing and/or programing the vehicle. In this arrangement, the repair facility thus communicates with the authorized remote computer system via the remote diagnostic system, where the remote diagnostic system thus operates as an intermediary for utilization of the diagnostic software applications for scanning, diagnosing and/or programing a vehicle at the repair facility.

SUMMARY OF THE INVENTION

The present invention provides a vehicle diagnostic system and method that employs preestablished profiles for aiding and promoting the connection between a vehicle and the remote vehicle scanning, diagnosing and/or programming.

In accordance with an aspect of the present invention, a method of establishing remote diagnostic data communications between a local diagnostic computer system and a remote diagnostic computer system comprises connecting a local vehicle diagnostic computer system at a repair facility to a vehicle at the repair facility to be in communication with an electronic system of the vehicle, initiating a connection between the local vehicle diagnostic computer system and a remote diagnostic computer system, where the remote diagnostic computer system is located remotely from the repair facility and comprises a diagnostic application program for use with the electronic system of the vehicle. The method further comprises selecting a remote data connectivity profile based on one or more data connectivity factors, with the remote data connectivity profile being operable to set diagnostic data transmission parameters between the local vehicle diagnostic computer and the remote diagnostic computer, whereby diagnostic data communications are exchanged between the local vehicle diagnostic computer system and the remote diagnostic computer system based on the remote data connectivity profile.

According to particular embodiments, the step of exchanging diagnostic data communications between the local vehicle diagnostic computer system and the remote diagnostic computer system involves exchanging vehicle diagnostic data based on the diagnostic application program, and involves converting data signals between a vehicle electronic system protocol and an internet data transmission protocol.

In a particular embodiment, the step of selecting a remote data connectivity profile comprises a manual selection, such as being selected by a technician at the remote diagnostic computer system. Alternatively, and/or additionally, the system involves an automatic selection of a remote data connectivity profile, such as by the remote diagnostic computer system.

The data connectivity factors may include one or more of the (i) make of the vehicle, (ii) location of the repair facility, (iii) latency of an internet connection between the local diagnostic computer system and the remote diagnostic computer system, (iv) type of diagnostic application program located at the remote diagnostic computer system requested to be accessed via the local diagnostic computer system, and (v) type of computer components of the local diagnostic computer system. Still further, the selecting of a remote data connectivity profile may comprise configuring the remote data connectivity profile based on a plurality of data connectivity factors.

The method may further comprise obtaining a vehicle identification number (VIN) of the vehicle and determining the vehicle make via the VIN, and where the vehicle make comprises the data connectivity factor.

In a particular embodiment the diagnostic data transmission parameters comprise a timing parameter and/or a protocol conversion application for exchange of diagnostic data between the local vehicle diagnostic computer system and the remote diagnostic computer system.

In accordance with another aspect of the present invention, a system for remote diagnostics between a local diagnostic computer system and a remote diagnostic computer system is provided where the local vehicle diagnostic computer system is disposed at a repair facility and is configured to be connected to a vehicle at the repair facility to be in communication with an electronic system of the vehicle, and where the remote diagnostic computer system is located remotely from the repair facility and comprises a plurality of diagnostic application programs for use in diagnosing electronic systems of vehicles. The system further includes a plurality of remote data connectivity profiles that are operable to set diagnostic data transmission parameters between the local vehicle diagnostic computer and the remote diagnostic computer, where individual ones of the remote data connectivity profiles are selectable based on one or more data connectivity factors.

In a particular configuration the remote data connectivity profiles reside at the remote diagnostic computer system, and may be manually selectable by a technician at the remote diagnostic computer system, or may be automatically selectable by the remote diagnostic computer system.

The remote vehicle diagnostic system and method of the present invention employing remote data connectivity profiles readily enables the connection between the remote diagnostic computer and the local diagnostic computer for exchange of diagnostic data of a vehicle electronic system there between. These and other objects, advantages, purposes and features of this invention will become apparent upon review of the following specification in conjunction with the drawings.

DESCRIPTION OF THE PREFERRED EMBODIMENTS

The present invention will now be described with reference to the accompanying figures, wherein the numbered elements in the following written description correspond to like-numbered elements in the figures.

Figure 1:
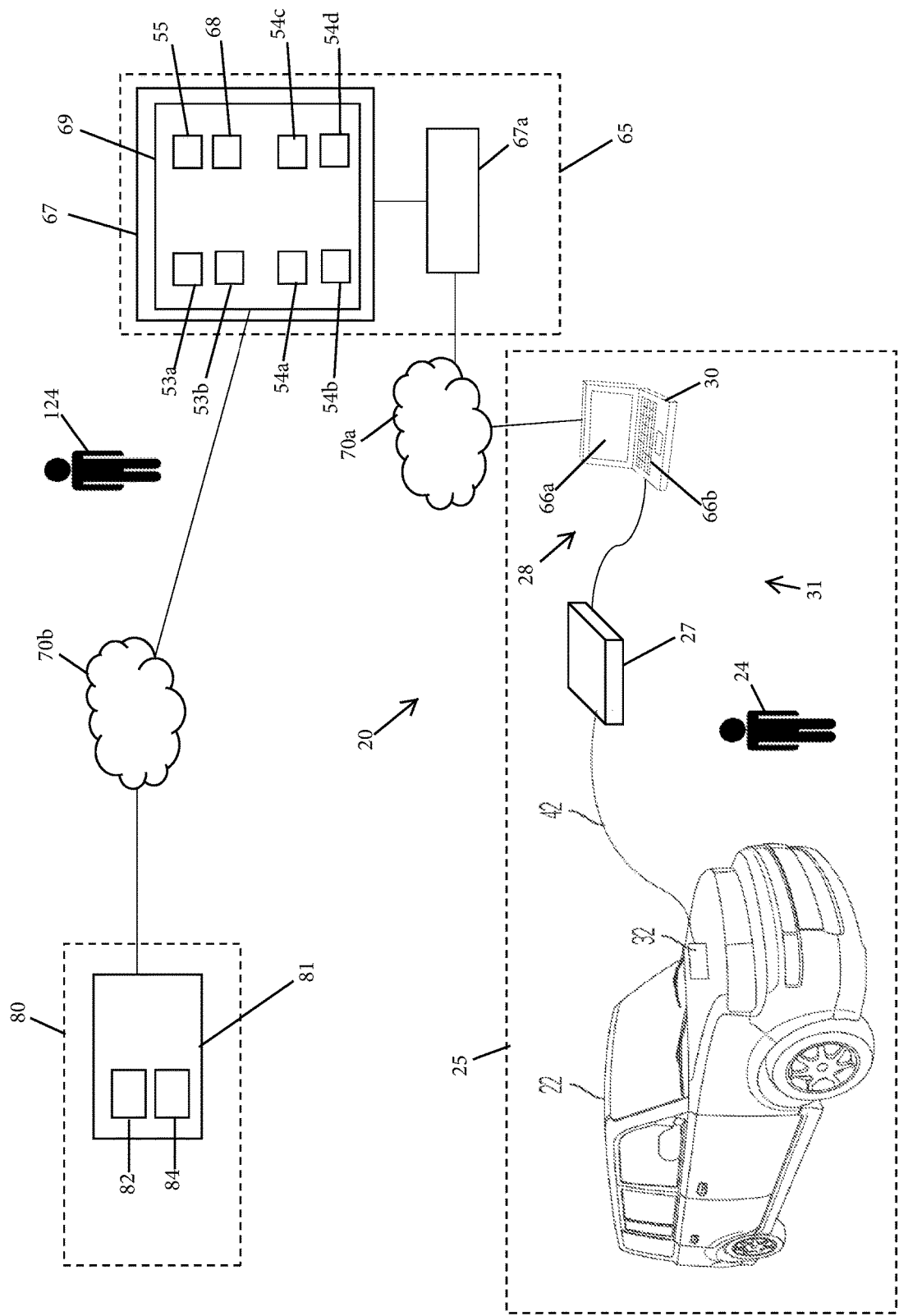
FIG. 1 is a schematic illustration of a vehicle diagnostic arrangement in accordance with the present invention in which a remote diagnostic system is shown in use with a vehicle.
Figure 2:
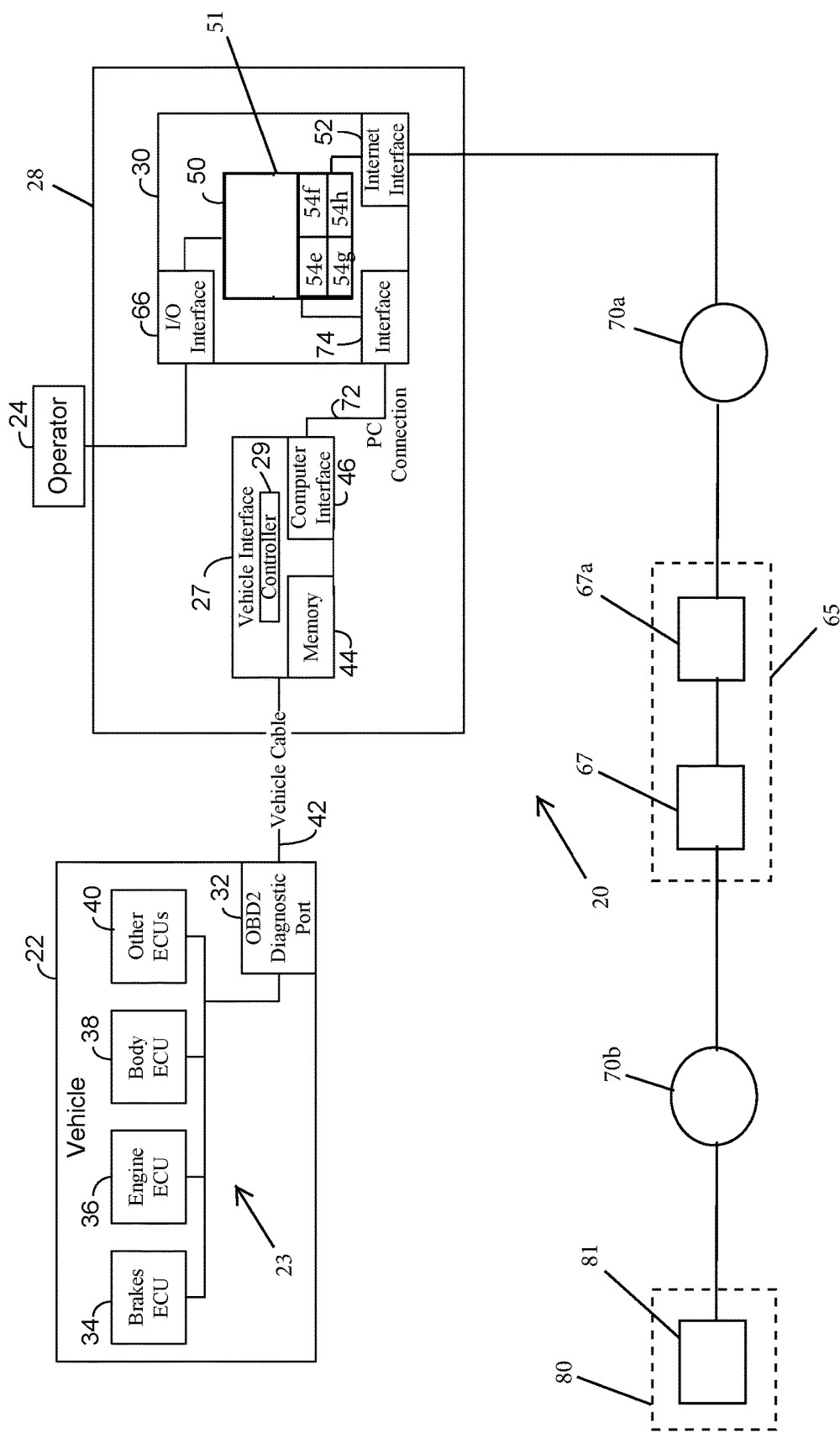
FIG. 2 is a detailed block diagram of the vehicle diagnostic arrangement of FIG. 1.

With reference to FIGS. 1 and 2, a vehicle diagnostic system or arrangement 20 for use with a vehicle 22 is shown for use by a mechanic or operator 24, such as in an automotive repair facility 25. As shown, a vehicle diagnostic computer tool or system 28, which as discussed in more detail below, is connected with vehicle 22 by operator 24 in order to diagnose the electronic system 23 of vehicle 22, including various vehicle electronic control units (ECUs), such as an engine ECU 34, body ECU 36, brakes ECU 38, and/or other ECUs 40, and/or other electronic parts and components of vehicle 22, including safety system ECUs, such as ADAS and airbag ECUs. Vehicle interface tool 28 connects with port 32, such as via vehicle cable 42. In the illustrated embodiment diagnostic computer tool 28 comprises a vehicle interface device or interface tool 27 that is communicatively coupled to a local computer 30, such as a laptop computer, tablet or a custom computer device. In the illustrated embodiment the diagnostic computer tool 28 comprising interface tool 27 and local computer 30 comprise local diagnostic computer system or equipment 31 that is configured to be connected to a remote diagnostic computer or computer system 65, such as by an Internet connection 70a, where the remote diagnostic computer system 65 includes one or more diagnostic scanning program applications 53a, 53b that are used to remotely scan and diagnose the electronic system 23 of vehicle 22, where a given diagnostic scanning program applications 53a, 53b is used depending on, for example, the make, model and/or year of a vehicle, as well as other considerations. It should be appreciated that there can be variation in the remote connection between the local diagnostic equipment 31 with the remote diagnostic computer system 65 depending on various data connectivity factors, such as the vehicle make, model and year, specifics of the hardware and software of the remote diagnostic computer system 65 and local diagnostic equipment 31, location of the repair facility 25, internet latency and/or connection speed, and the like. Accordingly, as discussed in more detail below, in order to facilitate the connection between the remote diagnostic computer system 65 and the local diagnostic equipment 31 and in accordance with aspects of the present invention, an electronic remoter data profile 54 may be configured or provided at the remote diagnostic computer system 65 and/or the local diagnostic equipment 31 to aid in the connection and communication there between.

Referring again to the local diagnostic equipment 31, vehicle interface tool 27 includes a controller 29, such as in the form of a processor or micro-processor and interface circuitry to facilitate communication between the ECUs and the vehicle interface tool 27, with interface tool 27 including a database of vehicle protocols found in a local memory 44 that allow communication with the ECUs of various makes and models of vehicles. Vehicle interface tool 27 additionally includes a computer interface 46 for connection with local computer 30, such as via a standard interface 74, such as by way of a USB, Bluetooth, Wi-Fi, or the like connection 72. In the illustrated embodiment interface module 27 may be configured as a SAE standard J2534 device, such as a device compliant with the J2534-2 standard, or as an ISO compliant or other standard compliant device for supporting and enabling communication with the electronic systems of a vehicle. Although diagnostic tool 28 is shown in the illustrated embodiment as comprising separate components of interface device 27 and computer 30, it should be appreciated that diagnostic tool 28 may comprise an integrated unit, such as the vehicle diagnostic tool of U.S. Pat. App. Ser. No. 16/701,967, which is incorporated herein by reference in its entirety.

As also understood from FIGS. 1 and 2, the local diagnostic computer system 31, such as via the local computer 30, is configured to be connected to the remote diagnostic computer system 65, such as by an Internet connection 70a, where in the illustrated embodiment remote diagnostic computer system 65 includes a remote diagnostic computer 67 and a remote diagnostic computer interface device 67a. The remote diagnostic computer system or computer 67 may be configured as a tablet, laptop computer, desktop computer, server, custom computer device, or the like. In operation, operator 24 may establish the connection between the local diagnostic equipment 31 and the remote diagnostic system 65, such as by way of an interface 66 on local computer 30 that may include a touch screen 66a or keyboard 66b. In particular, local computer 30 includes a memory 50 having one or more protocol conversion applications 51a for converting data information received from interface tool 27 to an internet transmittable protocol for transmission to remote diagnostic computer system 65, as well as for converting an internet transmittable protocol signal received from remote diagnostic computer system 65 to a protocol for transmission to vehicle interface tool 27, and then to the vehicle electronic system 23 of vehicle 22. For example, in the case of remote data transmissions via Internet connections such as shown in the illustrated embodiment, the transmission of signals over the Internet may include conversion from a vehicle interface tool 27 protocol to and from TCP/IP ("transmission control protocol/Internet protocol") or UDP ("user datagram protocol"). Vehicle diagnostic computer tool 28 thus converts signals to and from the particular protocol of the vehicle electronic system 23 of the vehicle 22 and converts the signals to and from an Internet compatible transmission format.

Likewise, in addition to diagnostic computer 67, remote diagnostic system 65 also includes one or more hardware devices and/or software applications for enabling Internet communication with local diagnostic equipment 31, such as via a remote diagnostic computer interface device 67a and one or more protocol conversion applications 68 retained in memory 69 of remote diagnostic computer 67 that is configured to convert between different communication protocols in similar manner to protocol conversion application 51a discussed above. This includes for example with respect to the illustrated embodiment, converting received TCP/IP or UDP protocol signals from local computer 30 to a protocol for use by the diagnostic computer system 65, as well as converting signals from the diagnostic computer system 65 to a protocol for transmission of signals over the Internet connection 70a. In the illustrated embodiment remote interface computer device 67a is located proximate to diagnostic computer 67 and is operably connected, such as via a USB, Ethernet or WiFi connection, LAN network, or the like. As understood from FIG. 2, local computer 30 includes an interface 52 for enabling communication between local computer 30 and remote diagnostic system 65 via Internet connection 70a. It should be appreciated that computer interface device 67a may be a separate component or integrated with diagnostic computer 67. It should also be appreciated that diagnostic computer system 65 may additionally include SAE J2534 functionality by way of module 55 comprising either a separate hardware device or components and software integrated into diagnostic computer 27. In operation, module 55 may be used for enabling diagnostic communications with diagnostic applications 53a, 53b. Still further, although diagnostic applications 53a, 53b are disclosed as residing in memory 69 of diagnostic computer 67, in a further alternative arrangement a separate scan tool device may be employed on which diagnostic applications 53a, 53b may reside. Or, as noted below, diagnostic applications may be accessed from an authorized remote diagnostic computer system 80. Accordingly, it should be appreciated that remote diagnostic computer or computer system 65 may be variously configured to operate for connecting with local diagnostic computer equipment 31 for remote diagnostics of the electronic system 23 of vehicle 22, including with various hardware and software components being separate or integrated together.

Remote diagnostic computer system 65 may be configured to remotely scan, diagnose and program vehicle electronic systems 23 either by way of interfacing with an authorized remote diagnostic computer system 80 that supports the diagnostic applications, or by having diagnostic applications downloaded directly on the remote diagnostic computer system 65. In the illustrated embodiment, for example, remote diagnostic computer 65 includes a plurality of diagnostic application scanning programs 53a, 53b. In the illustrated embodiment, diagnostic application scanning programs 53a, 53b comprise commercially available programs that are configured for use with a specific vehicle 22 and may be used or selected by a mechanic 24 or a remote diagnostician 124 operating diagnostic computer system 65. In the illustrated embodiment diagnostic application program 53a comprises an aftermarket scan program and diagnostic application program 53b comprises an OE scan program. Although shown as having two diagnostic application programs 53a, 53b, it should be appreciated that system 65 may include more than two such programs available for use with a given vehicle 22 and/or including additional diagnostic application programs for use with other vehicles, depending on make, model and/or year of a given vehicle.

It should be appreciated that the diagnostic application scanning programs 53a, 53b are stored in a memory 69 of diagnostic computer 65, where an exemplary aftermarket diagnostic application scanning program 53a comprises a program provided by an automotive manufacturer or a company that supplies diagnostic application programs, such as Opus IVS, Inc. of Ann Arbor, Michigan, and the OE diagnostic application scanning program 53b comprises a program provided by a domestic or foreign OEM, such as Ford, General Motors, Toyota or the like, with the diagnostic application scanning tool 28 configured to enable the reading and reporting of fault codes in the electronic system 23 of the vehicle 22 such as may be located in ECUs of the vehicle. As noted, in practice, diagnostic computer system 65 may include multiple diagnostic application programs, each for use with various makes and/or models of vehicles to enable diagnosing and programming of ECUs, including depending on the particular vehicle systems/ECUs on the vehicle installed by the OEM based on the vehicle purchaser's selection of vehicle options. Alternatively and/or additionally, diagnostic computer system 65 may include diagnostic application programs that may be used with multiple variations of vehicles. Remote diagnostic computer system 65 and local diagnostic equipment 31 are thus cooperatively used for querying/scanning and diagnosing ECUs of vehicle 22, including for accessing error codes generated by the ECUs for assessing and diagnosing operational and performance related aspects of the vehicle 22

In the case of the remote diagnostic computer system 65 interfacing with an authorized remote diagnostic computer system 80, such as may be operated or authorized by an OEM, the communication occurs as shown in the illustrated embodiment over another Internet connection 70b. Authorized remote diagnostic computer system 80 includes one or more computer devices, such as a server or other computer device comprising an authorized remote diagnostic computer 81, supporting one or more diagnostic software applications. In the illustrated embodiment authorized remote diagnostic computer system 80 is shown to include one or more diagnostic software applications 82, where each diagnostic software application 82 may be used, for example, with different models of vehicles and/or vehicles having different options. Authorized remote diagnostic computer system 80 likewise includes one or more protocol conversion applications 84.

It should be appreciated that repair facility 25, remote diagnostic system 65 and authorized remote diagnostic computer system 80 are in physically separate locations from each other, where they may be separated by great distances, such as each being separated by many miles or even in separate states, with communication occurring there between, for example, via electronic information exchange, such as via the Internet. As previously noted, there can be variations in the way and manner in which remote connections are made when remotely connecting to a vehicle 22 at a repair facility 25 by way of a remote diagnostic computer system 65, including for example, based on the vehicle make, model and/or year, specifics of the hardware and software of the remote diagnostic computer system 65 and local diagnostic equipment 31, location of the repair facility 25, internet latency and/or connection speed, and the like. Accordingly, as discussed herein, in order to facilitate the connection between the remote diagnostic computer system 65 and the local diagnostic equipment 31, electronic remoter data profiles may be established or provided, such as at the remote diagnostic computer system 65 to aid in the connection and communication there between.

In the illustrated embodiment, multiple electronic remote or remoter data connection profile files or programs 54a, 54b, 54c, 54d are shown that may be retained in memory 69 of remote diagnostic computer 65 or may be configured based on various connectivity data factors. As discussed in more detail below, the remoter data connection profile files 54a, 54b, 54c, 54d aid in establishing the connection between the remote diagnostic computer system 65 and the local diagnostic equipment 31. In particular, the remoter data profile files establish a configuration to the connection between the remote diagnostic computer system 65 and the local diagnostic equipment 31 based on particular connectivity factors whereby the communication connection between the remote diagnostic computer system 65 and the local diagnostic equipment 31 is readily and accurately established. As previously noted, the various connectivity factors can include the vehicle make, model and/or year, specifics of the hardware and software of the remote diagnostic computer system 65 and local diagnostic equipment 31, location of the repair facility 25, internet connection speed and/or latency, and the like. Although in the illustrated embodiment there are shown remoter data profile files 54a, 54b, 54c, 54d retained in memory 69 of remote diagnostic computer 65, it should be appreciated that in an alternative arrangement there may be remoter data profile files located, for example, in memory 50 of local computer 30, such as shown at 54e, 54f, 54g, 54h, where remoter data profile files 54e, 54f, 54g, 54h may be complimentary to or employed in place of remoter data profile files 54a, 54b, 54c, 54d. Additionally or alternatively, remoter data profiles may be retained or configured at the authorized remote diagnostic computer 81.

In one preferred embodiment electronic remoter data profile files 54a, 54b, 54c, 54d are retained in memory 69 of remote diagnostic computer 65 and are selectable or are configurable to configure the data communication connection between local diagnostic equipment 31 and remote diagnostic computer 65. For example, a given remoter data profile file 54a, 54b, 54c, 54d may be manually selectable by an operator 124 via remote diagnostic computer 65, such as by way of a conventional keyboard, screen selection, drop down menu, or the like. Such a selection may be based, for example, on the make, model and/or year of vehicle 22 that is to undergo remote diagnostics. The operator 124 may select a remoter data profile using a drop down menu, or by entering data into computer 65 to selectively designate the make, model and/or year of vehicle 22. Upon designating the given make, model and/or year of vehicle 22, an appropriate electronic remoter data profile file 54a, 54b, 54c, 54d is selected whereby remote diagnostic computer 65 is configured to exchange and/or send diagnostic data in a predetermined manner or configuration for accurately and readily establishing the remote connection between the remote diagnostic computer system 65 and the local diagnostic equipment 31.

Alternatively, a given remoter data profile file 54a, 54b, 54c, 54d may be automatically selectable by vehicle diagnostic system 20. For example, diagnostic computer tool 28 may initially obtain a vehicle identification number (VIN) from electronic system 23 from which the vehicle make, model and/or year may be determined. In one embodiment, local diagnostic equipment 31 is configured to parse or read the VIN to determine the make, model and/or year of vehicle 22, such as via a lookup database contained in memory 50. Alternatively, the VIN may be transmitted to remote diagnostic computer 65 with the vehicle make, model and/or year being determined by use of a remote lookup database, such as retained in memory 69 of remote computer 67. The VIN may be obtained by operator 24 entering into local diagnostic equipment 31, or by diagnostic computer tool 28 reading from electronic system 23, or by another such method. Remote computer system 65 may receive the VIN or the vehicle make, model and/or year and automatically select a remoter data profile file based thereon.

Selection of a given remoter data profile may be made based on still further connectivity factors, including for automatic selection. In an embodiment, remote diagnostic computer system 65 may configure the connection between local diagnostic equipment 31 and remote diagnostic computer system 65 based at least in part on the location or an identification of the repair shop 25. For example, diagnostic computer system 65 may receive identification information regarding a repair facility 25 at an initial stage of connection there between, with diagnostic computer system 65 configured to select a remoter data profile file 54a, 54b, 54c, 54d based thereon. For example, Internet Protocol ("IP") addresses for computer devices accessing the remote diagnostic computer 65 may be used. In an embodiment, diagnostic computer system 65 may include a database of remoter data profile files 54a, 54b, 54c, 54d, where a given profile file may be selected based on data from local diagnostic equipment 31, such as based on an identification of a repair facility 25.

Still further, remote diagnostic computer system 65 may be configured to automatically determine the latency of the internet connection for the exchange of data there between and configure the profile accordingly. In one embodiment this may be determined by an initial data exchange initiated by the remote diagnostic computer system 65. Still further, the profile may be configured based on the diagnostic application 53a, 53b that is being requested by the local diagnostic equipment 31. For example, if a connection between the local diagnostic equipment 31 and remote diagnostic computer system 65 is initially established with a request made via the local diagnostic equipment 31 for a Ford OEM diagnostic application, the connection profile can be configured accordingly.

A still further connectivity factor on which the communication profile is established may be the type of equipment employed in the local diagnostic equipment 31 at the repair facility 25 and/or remote diagnostic computer system 65, such as the vehicle interface tool 27 employed at the repair facility 25 and/or the type of remote interface tool 67a. For example, the vehicle interface tool 27 may be an SAE J2534 pass-thru device provided by any of a number of manufacturers, such as, for example, an Opus IVS pass-thru device. It should be appreciated that differing performance in the exchange of data from the vehicle 22 to the local computer 30 may be had based on the manufacture of such device. Accordingly, the electronic remoter data connection profile 54 may take the type of electronic equipment employed, such as the local diagnostic equipment 31, into account. In one embodiment, the operator 24 may provide initial information to the remote diagnostic computer system 65, such as the type of vehicle interface tool 27, specifics regarding the local computer 30, the types of data connections employed at the repair facility 25, and the like, from which the electronic remoter data connection profile 54 may be configured.

It should thus be understood that the connection profile 54 can be set based on one or more connectivity factors, and may be manually or automatically selected or selection may be made via configuring based on such connectivity factors. For example a remote data connectivity profile may be selected by configuring the profile based on multiple data connectivity factors The remoter data connectivity profile 54 may require spoofing, sending non-standard messages, or the like, to establish the connection and ensure that the diagnostic scan application 53a, 53b being remoted continues to operate. The electronic remoter data connection profile 54 may be used to configure or set various diagnostic data transmission parameters directed to facets of the communication between the remote diagnostic computer system 65 and the local diagnostic equipment 31. This can include, for example, the timing of data exchanges, such as based on the internet connection latency, or based on the diagnostic application 53a, 53b standards for communication, whereby a time delta for data exchanges is preset. This may further include the designation of a particular protocol conversion application 68 that is to be used at the remote diagnostic computer system 65.

Figure 3:
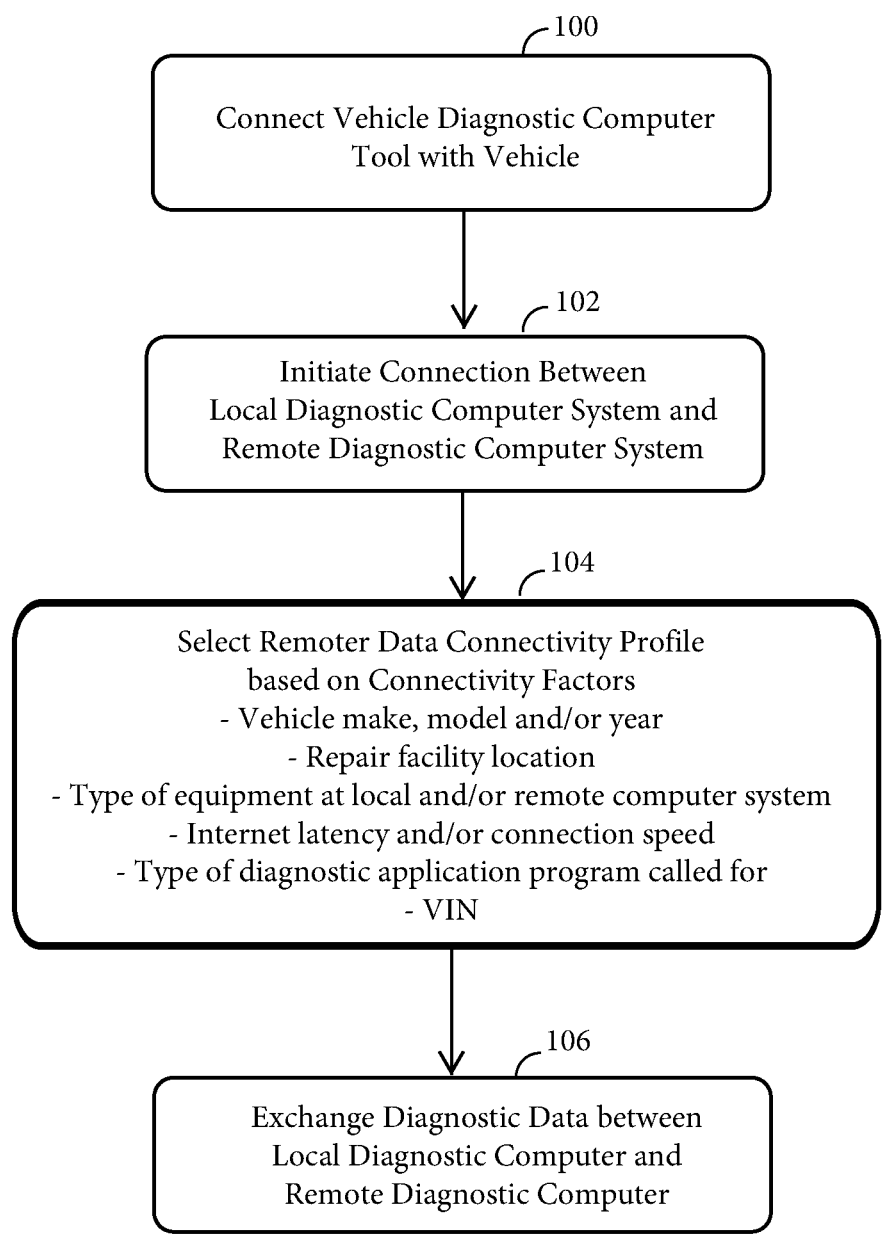
FIG. 3 is a flow diagram of a method in accordance with an aspect of the present invention for selecting a remoter data connectivity profile between the local diagnostic computer system and the remote diagnostic computer system.

An exemplary embodiment of the use and operation of the configuration and use of a remoter data connectivity profile 54 in accordance with the present invention is illustrated in FIG. 3. As there shown, at step 100 the vehicle diagnostic computer tool 28 is connected with vehicle 22 so as to be in communication with one or more ECUs of the electronic system 23. At step 102 a connection is initiated between the local diagnostic computer system 31 and the remote diagnostic computer system 65, such as by way of the internet connection 70a. At step 104, a remoter data connectivity profile 54 is manually or automatically selected based on one or more connectivity factors. Upon selecting the remoter data connectivity profile 54, data may be exchanged based thereon as shown at step 106 between remote diagnostic computer system 65 and local diagnostic computer system 31 for diagnosing, including programing and the like, of electronic system 23.

It should be appreciated that vehicle diagnostic arrangement 20 may be configured to be selectively operable in one of a plurality of different modes, whereby a technician may use the vehicle diagnostic computer tool 28 for vehicle maintenance, diagnosis, programming and repair as needed. Moreover, in the illustrated embodiment vehicle interface tool 27 and local computer 30 are shown as separate components making up a local diagnostic computer system 31, that is with local computer 30 being proximate at the repair facility 25 such that it is proximate the vehicle 22. As noted, in an alternative arrangement, vehicle interface tool 27 and local computer 30 may be integrated in a vehicle diagnostic computer 28 (FIG. 2), which would likewise be proximate the vehicle at the repair facility. Likewise, although scan tool device 67 and remote interface computer device 67a are illustrated as separate components, in an alternative arrangement they may be integrated together in a hardware system comprising various controllers and software modules.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A method of establishing remote diagnostic data communications between a local diagnostic computer system and a remote diagnostic computer system comprising:
    connecting a local vehicle diagnostic computer system at a repair facility to a vehicle at the repair facility to be in communication with an electronic system of the vehicle;
    initiating a connection between the local vehicle diagnostic computer system and a remote diagnostic computer system, where the remote diagnostic computer system is located remotely from the repair facility and comprises a diagnostic application program for use with the electronic system of the vehicle;
    selecting a remote data connectivity profile from a plurality of remote data connectivity profiles retained in at least one of the remote diagnostic computer system and the local vehicle diagnostic computer system, wherein the remote data connectivity profile is selected based on one or more data connectivity factors and is operable to set diagnostic data transmission parameters for controlling the exchange of diagnostic data between the local vehicle diagnostic computer system and the remote diagnostic computer system, wherein the one or more data connectivity factors includes at least one of the location of the local vehicle diagnostic computer system and the latency of the connection between the local vehicle diagnostic computer system and the remote diagnostic computer system; and
    exchanging diagnostic data communications between the local vehicle diagnostic computer system and the remote diagnostic computer system based on the remote data connectivity profile.

2. The method of claim 1, wherein said exchanging diagnostic data communications between the local vehicle diagnostic computer system and the remote diagnostic computer system comprises exchanging vehicle diagnostic data based on the diagnostic application program.

3. The method of claim 2, wherein said exchanging diagnostic data communications between the local vehicle diagnostic computer system and the remote diagnostic computer system comprises converting data signals between a vehicle electronic system protocol and an internet data transmission protocol.

4. The method of claim 1, wherein said selecting a remote data connectivity profile comprises a manual selection.

5. The method of claim 4, wherein said selecting a remote data connectivity profile is done by a diagnostician at the remote diagnostic computer system.

6. The method of claim 5, wherein the one or more data connectivity factors includes at least the make of the vehicle.

7. The method of claim 1, wherein said selecting a remote data connectivity profile comprises an automatic selection by the remote diagnostic computer system.

8. The method of claim 7, wherein the one or more data connectivity factors comprise at least one of the (i) make of the vehicle, (ii) location of the repair facility, (iii) type of diagnostic application program located at the remote diagnostic computer system requested to be accessed via the local diagnostic computer system, and (iv) type of computer components of the local diagnostic computer system.

9. The method of claim 1, further comprising obtaining a vehicle identification number (VIN) of the vehicle and determining the vehicle make via the VIN, and wherein the vehicle make comprises the data connectivity factor.

10. The method of claim 1, wherein the diagnostic data transmission parameters comprise a timing parameter for exchange of diagnostic data between the local vehicle diagnostic computer system and the remote diagnostic computer system.

11. The method of claim 1, wherein the diagnostic data transmission parameters comprise a protocol conversion application for exchange of diagnostic data between the local vehicle diagnostic computer system and the remote diagnostic computer system.

12. The method of claim 1, wherein said selecting the remote data connectivity profile comprises configuring the remote data connectivity profile based on a plurality of data connectivity factors.

13. A system for remote diagnostics between a local diagnostic computer system and a remote diagnostic computer system comprising:
   a local vehicle diagnostic computer system at a repair facility, said local vehicle diagnostic computer configured to be connected to a vehicle at the repair facility to be in communication with an electronic system of the vehicle;
   a remote diagnostic computer system located remotely from the repair facility, wherein said remote diagnostic computer system comprises a plurality of diagnostic application programs for use in diagnosing electronic systems of vehicles;
   a plurality of remote data connectivity profiles retained in at least one of the local vehicle diagnostic computer system and the remote diagnostic computer system, wherein the remote data connectivity profile is operable to set diagnostic data transmission parameters between the local vehicle diagnostic computer and the remote diagnostic computer; and
   wherein individual ones of said remote data connectivity profiles are selectable based on one or more data connectivity factors, wherein the one or more data connectivity factors include at least one of the location of the local vehicle diagnostic computer system and the latency of the connection between the local vehicle diagnostic computer system and the remote diagnostic computer system.

14. The system of claim 13, wherein said remote data connectivity profiles reside at said remote diagnostic computer system.

15. The system of claim 14, wherein said remote data connectivity profiles are manually selectable by a diagnostician at the remote diagnostic computer system.

16. The system of claim 14, wherein the one or more data connectivity factors comprise at least one of the (i) make of the vehicle, (ii) location of the repair facility, (iii) type of diagnostic application program located at the remote diagnostic computer system requested to be accessed via the local diagnostic computer system, and (iv) type of computer components of the local diagnostic computer system.

17. The system of claim 14, wherein the one or more data connectivity factors includes at least the make of the vehicle.

18. The system of claim 14, wherein said selecting a remote data connectivity profile comprises an automatic selection by the remote diagnostic computer system.

19. The system of claim 14, wherein the diagnostic data transmission parameters comprise a timing parameter for exchange of diagnostic data between the local vehicle diagnostic computer system and the remote diagnostic computer system.

20. The system of claim 14, wherein the diagnostic data transmission parameters comprise a protocol conversion application for exchange of diagnostic data between the local vehicle diagnostic computer system and the remote diagnostic computer system.

\* \* \* \* \*